United States Patent [19]
Yglesias

[11] 3,971,590
[45] July 27, 1976

[54] TRAILER TOP RAIL SYSTEM

[75] Inventor: James Raymon Yglesias, Savannah, Ga.

[73] Assignee: Great Dane Trailers, Inc., Savannah, Ga.

[22] Filed: Oct. 11, 1974

[21] Appl. No.: 514,751

[52] U.S. Cl. .............................................. 296/104
[51] Int. Cl.$^2$ ....................................... B62D 25/06
[58] Field of Search .................. 296/104, 40, 28 M; 105/409, 423, 372

[56] References Cited
UNITED STATES PATENTS

| | | | |
|---|---|---|---|
| 3,027,187 | 3/1962 | Rivers | 296/28 M |
| 3,061,364 | 10/1962 | Tantlinger | 296/28 M |
| 3,226,153 | 12/1965 | Haid | 296/104 |
| 3,376,063 | 4/1968 | Hulverson | 105/409 X |

Primary Examiner—M. H. Wood, Jr.
Assistant Examiner—R. Schrecengost
Attorney, Agent, or Firm—Francis A. Keegan

[57] ABSTRACT

A two piece top rail assembly for interchangeable use in constructing both open top trailers with exterior posts and exterior skin. The rail assembly includes an elongated outside element having in cross section a depending base leg for securing to the posts on the trailer. A lower cross leg is secured in angle to the base leg and an intermediate leg is secured to the lower cross leg and has at least a portion extending substantially in the opposite direction to the base leg. An upper cross leg is secured to the intermediate leg and extends at an angle substantially in the direction toward the base leg. An inside element that may be used in two positions in contact with the outside element includes a connecting leg extending between and connecting first and second transverse leg. Openings which are in alignment are provided in the first and second transverse leg for receiving the roof bow. The resulting top rail assembly will be used for exterior skin or exterior post construction and maintains a common roof bow length and height as well as common overall exterior width and inside clear width. Additionally, the roof tarp is protected.

21 Claims, 5 Drawing Figures

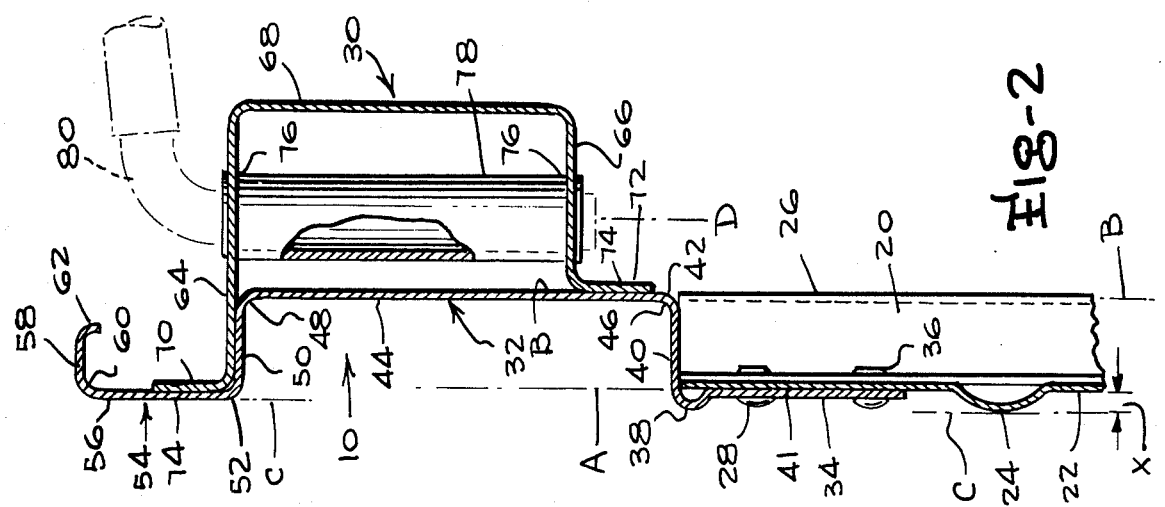
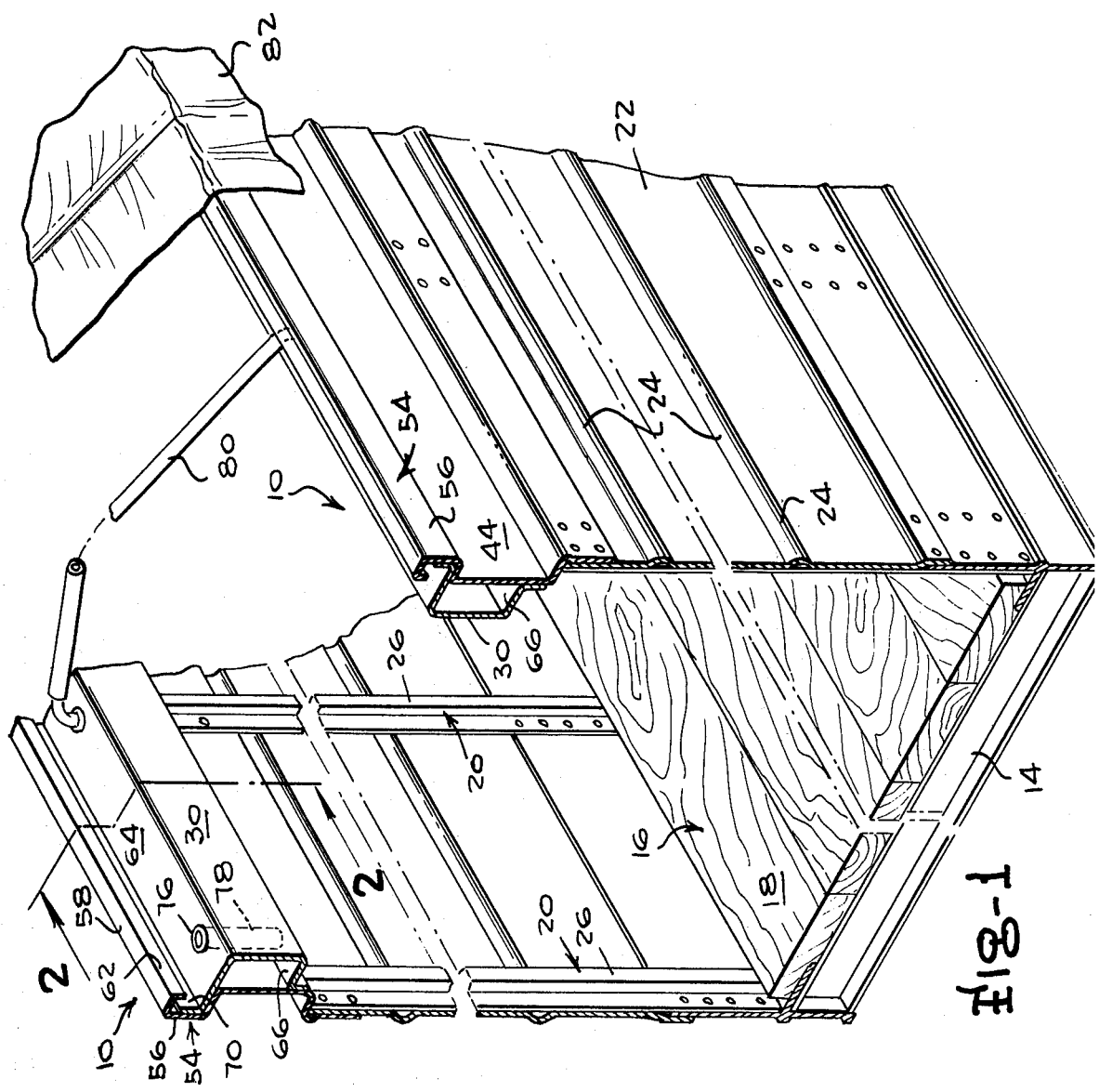

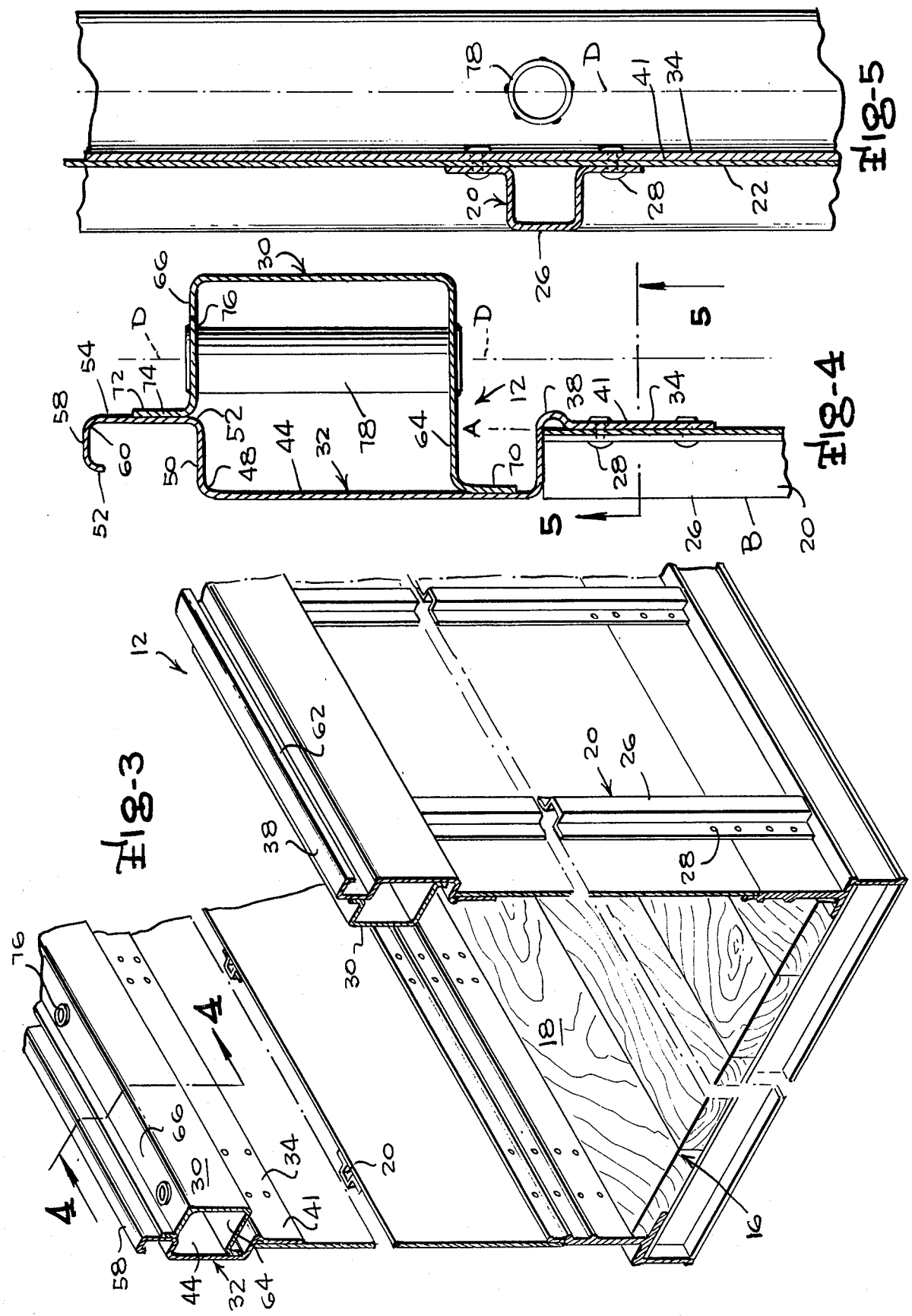

TRAILER TOP RAIL SYSTEM

BACKGROUND OF THE INVENTION

There are essentially two different types of trailers or semi-trailers of sheet and post side panel construction in use in the trailer industry today. The structural differences between the two are well known to be that, (a) the exterior skin side panel construction consists of side sheets on the exterior surface of the panel fastened to vertical posts or stiffeners positioned on the interior surface and in contrast, (b) the exterior post side panel construction consists of side sheets on the interior surface of the panel fastened to vertical posts or stiffeners positioned on the exterior surface.

These two different types of side wall constructions used in trailers and semi-trailers uniquely satisfy different needs of the trailer user. The exterior post configuration essentially provides a smooth interior surface without the need for interior lining which results in greater inside width and cube. Where inside width is not a critical factor the exterior skin configuration provides a relatively smooth exterior surface which aids in the installation of signs and decals, results in less wind resistance encountered over-the-road and, is less susceptible to damage from tree limbs, other obstacles, etc.

The wide use of both of these types of trailers requires that trailer manufacturers inventory the necessary components to build both types of trailers. The geometrical differences of both side panel constructions require modifications in the upper and lower longitudinal support members in order to provide maximum interior dimensions within the maximum exterior dimensions allowed by state laws. This requirement most often results in two totally unique top rail assemblies.

In manufacturing top rails for trailers having open tops, the trailer manufacturing industry often utilizes roll formed sections, but with increased loads handled by the transportation industry requiring stronger structural elements, the inherent limitations of roll-forming to form these elements from thicker gauge metals are quite apparent.

To decrease the weight of individual elements and offset the required greater thickness, a multiple piece top rail is being used extensively. Often such top rail assemblies were believed to require three or more pieces even though a two piece assembly is more desirable.

The use of two piece top rails while having substantial advantages, also raised new problems. Principally, the problems arose from the fact that to form two piece top rails and use them for both exterior post and exterior skin side panel configurations two pieces for each configuration or a total of four pieces were actually required. These four individual pieces, each possessing its outer unique cross section prevent interchangeability between top rail assemblies for exterior post and exterior skin constructions.

In roll forming these structural elements, a separate set of rolls is required for each different cross section. Therefore, as many as four different sets of rolling dies would be required to satisfy design requirements. The cost of a set of rolls to form one piece of a top rail assembly is quite substantial and therefore there is a distinct advantage to limit the number of roll forming dies required. Previous attempts by designers to cope with this costly problem have still resulted in a minimum of three uniquely different cross sections and a substantial cost increase.

Another drawback to the four pieces required to meet the demands of both an exterior post and exterior skin construction is that double inventories must be maintained by the trailer manufacturer prior to the trailer construction.

An important consideration in any acceptable design for a two piece top rail is the requirement that upon installation in either an exterior skin or exterior post construction certain dimensional characteristics must remain constant. Among these are roof bow length and height or arc, overall exterior width, inside clear width, roof tarp protection and side panel height in relation to the overall height of the vehicle. To achieve these characteristics interchangeability must not be sacrificed.

In order to meet the requirements of maintaining constant roof bow length for trailer constructions of an exterior skin or exterior post, it is important that the top rail assemblies make due allowance for the fact that the vertical posts are not in the same transverse position in the trailer bed. For instance, for the exterior skin side panel construction, corrugations on the exterior skin are usually required necessitating that the posts be moved transversely inwardly to permit these corrugations on the exterior skin to be within the maximum legal allowable exterior width. For the exterior posts construction the posts are positioned laterally outwardly to the maximum degree permissable under the law governing exterior width of trailers and since no panel is to be positioned transversely outwardly of the posts, the posts are positioned further outwardly than in the exterior skin panel construction. Because the posts support the top rail assembly, the variation in spacing between transversely opposed posts must be considered in any acceptable design of the top rail assembly usable for either of the exterior post or exterior skin panel construction.

SUMMARY OF THE INVENTION

The present invention relates to open top rail assemblies for trailers and semi-trailers. More particularly the present invention relates to a two piece top rail assembly which may be used interchangeably for an exterior post trailer construction or an exterior skin trailer construction without producing a change in the roof bow length, inside clear width or overall width.

The two piece open top rail assembly for interchangeable use consists of an elongated outside element and vertically reversible inside element which is secured to the outside element to form either the two piece top rail assembly for a trailer with an exterior post or an exterior skin construction. The outside element has in cross section a depending base or first leg that is to be secured to the trailer post and a lower cross or second leg secured at an angle to the base leg. The intermediate or third leg is secured to the lower cross leg and has at least a portion extending substantially away from the base leg and may be parallel to the base leg. An upper cross leg is secured to the intermediate leg and extends at an angle that may be parallel to the lower cross leg. The upper cross leg is of greater transverse length in an amount equal to the depth of the corrugation. An upper or fifth leg extends from the upper cross leg substantially parallel to the base leg.

The inside element is secured to the outside element in either vertical reverse position where the inside element has its longitudinal axis selectively rotated in a vertical plane to be secured to the outside element having its longitudinal axis rotated selectively in a horizontal plane.

The inside element includes the first and second transverse legs extending between a connector leg which may be parallel to the intermediate leg of the outside element. Openings which are aligned in the first and second transverse legs may receive a roof bow socket for receiving the roof bow.

OBJECTS OF THE INVENTION

The principal object of the present invention is to provide a two piece top rail assembly that may be interchangeably used to construct an open top trailer having either an exterior post or an exterior skin panel construction.

It is also an object of the present invention to provide a two piece top rail assembly for interchangeable use in constructing either an exterior post or exterior skin panel construction for an open top trailer that maintains the same roof bow length, overall exterior width and inside clear width.

Another object of present invention is to provide a top rail assembly that may be used to construct open top trailers of either an exterior post or exterior skin panel construction that permits the exterior post to be spaced transversely at different distances in accordance with the particular panel construction chosen and not require different roof bow lengths.

Further object of present invention is to provide a two piece top rail assembly for use in constructing open top trailers of either an exterior skin or an exterior post panel construction which is economical to manufacture and safe and effective to use.

THE DRAWING

FIG. 1 is a perspective view in cross section and partly broken away of an open top trailer having an exterior skin panel construction and utilizing the top rail assembly of the present invention.

FIG. 2 is a cross sectional view taken along lines 2—2 of FIG. 2 and illustrating the positioning of the outer and inner elements for construction of an open top trailer having an exterior skin.

FIG. 3 is a perspective view in cross section and partly broken away similar to FIG. 1 but showing the two piece top rail assembly differently positioned for construction of an exterior post open top trailer.

FIG. 4 is a cross sectional view taken along the lines 4—4 of FIG. 3 and illustrating the relative positions of the inner and outer elements forming the two piece top rail assembly of the present invention.

FIG. 5 is a cross sectional view partly broken away taken along lines 5—5 of FIG. 4.

DESCRIPTION OF PREFERRED EMBODIMENT

Referring to the drawings of FIGS. 1 and 3 to illustrate the two basically different side panel constructions for open top trailers. As used hereinafter the term "trailers" shall include semi-trailers as well as any mobile open top container that may or may not be wheeled.

In FIGS. 1 and 3, the open top trailer assembly is depicted generally at 10 to indicate the two piece top rail assembly for use with an exterior skin and at 12 to indicate the two piece top rail assembly for use in the exterior post construction. The basic trailer assembly includes horizontal support members 14 which may be formed from steel, or metal such as aluminum alloy and provide the basic support for the trailer. Flooring 16 that may be in the form of planks 18 formed from wood or other material may be suitably secured to the support members 14.

The posts 20 are suitably secured to the support members 14 in a conventional manner. The posts may be of conventional size and shape and as shown are in the form of channels of generally U-shape. As shown in FIG. 1, the exterior skin 22 is conventional panel construction and may be aluminum, steel or other material and is usually provided with a plurality of corrugations 24 which extend longitudinally along the length of the panel and are spaced vertically. The corrugation 24 as best shown in FIG. 2 usually extends on each side of the trailer to the maximum width allowable as measured from the longitudinal center line of the trailer so as to provide the maximum interior width. The term "corrugation" as used herein shall be construed to mean the protrusion or depth X of the curvature of the skin as shown in FIG. 2. Generally, X will be between 0.25 and 0.5 inches with about 0.35–0.4 preferred but any protrusion X may be found useful for the purpose of this invention. To permit this construction, the post 20 or exterior skin construction of FIGS. 1 and 2 is spaced transversely inwardly relative to the longitudinal center line of the trailer to allow for the corrugation 24.

In the exterior post open top trailer as shown in FIG. 3, the post 20 has its outermost surface 26 extending to the transverse limits permitted by law to permit the greatest interior width possible for the trailer. Accordingly, the post 20 when used for constructing the trailer having exterior posts will be positioned laterally outwardly from the longitudinal center line of the trailer a greater distance than for the exterior skin construction of FIG. 1 and equal to the protrusion X of the corrugation 24.

The panels forming either the external skin or the external post construction are secured to the posts in any suitable manner such as by rivets 28 or welding or the like. The manner and means of constructing the open top trailer other than the two piece top rail assembly does not constitute a part of the present invention.

As best shown in FIGS. 2 and 4 the top rail assemblies are composed of inside and outside elements 30 and 32 respectively.

The top rail assemblies 10 and 12 are formed from the inside and outside elements 30 and 32 and are generally roll formed by conventional roll dies designed to produce the cross sectional shapes that constitute novel aspects of the present invention. The top rail assemblies are generally composed of steel or high strength aluminum alloy or other suitable material of a thickness commensurate with the strength and characteristics designed for the particular trailer.

The outside element is formed into a generally flat U-shaped element having a depending base leg 34 which may be provided with suitable holes 36 which receive conventional bolts or rivets 28. Above the holes 36 an arc or bend is formed at 38 to provide a cross leg 40 which abuts the top 42 of the post 20. The cross leg 40 also vertically aligns the top rail assembly in proper position along the post 20. The lateral or transverse length of the cross leg 40 is defined as extending as shown in FIG. 2 from the plane A formed by the inside surface 41 of the depending base leg 34 to the inside surface of the leg 44 identified as plane B. The transverse length of the cross leg 40 therefore may be considered approximately equal to the thickness of the skin 22 and the total transverse width of the post 20 but is more precisely defined above.

Intermediate leg 44 is formed vertically at a sharp right angle bend at 46 and is essentially parallel to plane B and perpendicular to cross leg 40. At the upper extent of the intermediate leg 44 another right angle bend is shown at 48 to form upper cross leg 50 which extends essentially horizontally in the direction towards the base leg 34 to an extent to reach plane C.

The transverse length of upper cross leg 50 is longer than the transverse length of the cross leg 40, as defined, by the amount of the protrusion of the corrugation which distance is identified at X in FIG. 2. The transverse length of upper cross leg 50 is defined as measured from outside surface of leg 56, plane C, to the inside surface of leg 44, plane B. In providing this variation between the transverse lengths of cross leg 40 and upper cross leg 50, there is a built-in compensation for the change in the transverse position of the post between FIG. 2 and FIG. 4. It should be understood that these legs are shown to be horizontal and flat but that such shape is not critical and the measurements of the transverse lengths are to be made as the shortest distances between the planes identified. Upper cross leg 50 also provides an aligning and abutting function as shown in FIG. 2. This upper cross leg is bent at a right angle as shown at 52 to form upper leg 54 which has its outer surface 56 coincident with plane C.

The outside element is further provided with a tarp protection top leg 58 formed from a bend at 60 in the upper leg 54. Also for tarp protection top leg 58 may be provided with a depending lip 62. The transverse length of the top leg 58 should not be greater than the lateral length of upper cross leg 50 and lip 62 should be within the space separating vertical planes A and B. Preferably the transverse or lateral extent of top leg 58 is less than the lateral or transverse length of upper cross leg 50.

As shown in FIGS. 2 and 4 particularly, inside element 30 is provided with two transverse legs, a longer transverse leg 64 and a shorter leg 66. The transverse legs are secured together by a connector leg 68 which extends between the transverse legs and in position would be essentially parallel to intermediate leg 44 and at right angles to the substantially horizontal transverse legs 64 and 66. At the outer extremities of the transverse legs 64 and 66 there are provided outwardly extended feet 70 and 72 which may be used to secure the inside element 30 to the outside element 32 by suitable means such as welding at 74. A plurality of laterally spaced and aligned openings 76 are provided in transverse legs 64 and 66 which are also vertically aligned to hold a sleeve socket 78 for receiving the conventional roof bow 80. The openings 76 are spaced longitudinally along the length of the top rail assembly and have center-lines within plane D as best shown in FIGS. 1 and 3 to support a plurality of roof bows 80 to hold and shape the tarp 82 over the open top.

As assembled for the exterior skin panel construction of FIG. 1 the inside element 30 and outside element 32 are positioned as shown in FIG. 2 while to achieve the exterior panel construction as shown in FIG. 3, the outside element is rotated by turning its longitudinal axis which is parallel to the longitudinal axis of the trailer, a 180° turn in a horizontal plane. The outside element will then be facing in the opposite horizontal direction. The inside element 30 is then rotated by turning its longitudinal axis in a vertical plane for a 180° turn. The feet 70 and 72 are again welded or otherwise secured to the reverse faces of the same legs as previously described.

In order to achieve interchangeable use for either of the two panel constructions while maintaining the same bow length, the distance between the longitudinal center line of the trailer and plane D intersecting the center lines of the openings 76 is constant for either the exterior skin or exterior post construction. The distance between plane D and the outermost plane C as shown in FIG. 2 and the distance between plane D and the equivalent outermost surface identified by plane B in FIG. 4 are therefore equal.

It should be evident from the foregoing that the objects of the present invention have been met and that the invention should not be limited to the precise configurations shown except as embodied in the following claims.

I claim:
1. A two piece top rail assembly for interchangeable use in constructing both open top trailers with exterior posts and exterior skin having corrugations comprising:
   an elongated outside element having in cross section a depending first leg for securing to said trailer,
   a second leg secured at an angle to said first leg,
   a third leg secured to said second leg and having at least a portion extending substantially in the opposite direction to said first leg,
   a fourth leg secured to said third leg and extending at an angle substantially in the direction toward said first leg, said fourth leg having a transverse length greater than the transverse length of said second leg by the extent of the protrusion of the corrugation on said skin,
   a fifth leg secured to said fourth leg and extending substantially in the opposite direction to said first leg,
   an inside element secured to said outside element for extending toward the inside of said trailer and having first and second transverse legs,
   a connector leg extending between and connecting said first and second transverse legs, means within said first and second transverse legs for receiving a roof bow,
   whereby said inside and outside elements form a two piece rail assembly to form an open top trailer having either an exterior post or exterior skin.
2. The assembly by claim 1 including,
   said first leg being provided with a plurality of holes for receiving securing means.
3. The assembly of claim 1 including,
   said second leg having abutment and aligning means for contact with the vertical posts of the trailer.
4. The assembly of claim 1 including,
   said third leg extending vertically and forming a generally U-shape with said second and fourth legs.
5. The assembly of claim 1 including,
   said third leg being secured to one of said transverse legs.
6. The assembly of claim 1 including,
   said third leg being substantially parallel to said connector leg.
7. The assembly of claim 1 including,
   said second and fourth legs being mutually substantially parallel.
8. The assembly of claim 1 including, said fourth leg being provided with abutment and aligning means for contact with one of said transverse legs.

9. The assembly of claim 1 including, said fifth leg being substantially parallel to said first leg.

10. The assembly of claim 9 including, a sixth leg secured to said fifth leg and extending a transverse distance not greater than said fourth leg.

11. The assembly of claim 10 including, lip means provided at the end of said sixth leg.

12. The assembly of claim 1 including, said first leg being provided with a plurality of holes for receiving securing means, said second leg having abutment and aligning means for contact with the vertical posts of the trailer, said third leg extending vertically and forming a generally U-shape with said second and fourth legs, said third leg being secured to one of said transverse legs, said third leg being substantially parallel to said connector leg, said second and fourth legs being mutually substantially parallel, said fourth leg being provided with abutment and aligning means for contact with one of said transverse legs, and said fifth leg being substantially parallel to said first leg.

13. A subcombination for use in a two piece top rail assembly for interchangeable use in constructing both open top trailers with exterior posts and exterior skin having corrugations comprising:
an elongated outside element having in cross section a depending first leg for securing to said trailer,
a second leg secured at an angle to said first leg,
a third leg secured to said second leg and having at least a portion extending substantially in the opposite direction to said first leg,
a fourth leg secured to said third leg and extending at an angle substantially in the direction toward said first leg,
said fourth leg having a transverse length greater than transverse length of said second leg by the extent of the protrusion of the corrugation on said skin, and
a fifth leg secured to said fourth leg and extending substantially in the opposite direction to said first leg, 14. The subcombination of claim 13 including, said first leg being provided with a plurality of holes for receiving securing means, and said second leg having abutment and aligning means for contact with the vertical posts of the trailer.

15. The subcombination of claim 13 including, said third leg being secured to one of said transverse legs, said third leg being substantially parallel to said connector leg, said second and fourth legs being mutually substantially parallel, said fourth leg being provided with abutment and aligning means for contact with one of said transverse legs, and said fifth leg being substantially parallel to said first leg.

16. The subcombination of claim 13 including, said second leg having abutment and aligning means for contact with the vertical posts of the trailer, and said fourth leg being provided with abutment and aligning means for contact with one of said transverse legs.

17. The subcombination of claim 13 including, said first leg being provided with a plurality of holes for receiving securing means, said second leg having abutment and aligning means for contact with the vertical posts of the trailer, said third leg extending vertically and forming a generally U-shape with said second and fourth legs, said third leg being secured to one of said transverse legs, said third leg being substantially parallel to said connector leg, said second and fourth legs being mutually substantially parallel, said fourth leg being provided with abutment and aligning means for contact with one of said transverse legs, and said fifth leg being substantially parallel to said first leg.

18. A subcombination for use in a two piece top rail assembly for interchangeable use in constructing both open top trailers of the type with exterior posts and of the type with exterior skin comprising: an elongated inside element having in cross section a connector leg, first and second transverse legs extending from and connected to said connector leg, one of said transverse legs extending laterally in a transverse direction to said connector leg substantially beyond said other transverse leg, openings within each transverse leg and aligned for receiving a roof bow for supporting a tarp cover over said open top trailer.

19. The subcombination of claim 18 including, a socket sleeve positioned within said openings.

20. The subcombination of claim 18 including, outwardly extending feet positioned at the end of each said transverse leg.

21. A two piece top rail assembly for interchangeable use in constructing both open top trailers with exterior posts and exterior skin comprising:
an elongated inside element having in cross section a connector leg extending between first and second transverse legs,
one of said transverse legs extending laterally substantially beyond said other transverse leg,
openings within each transverse leg and aligned for receiving a roof bow for supporting a tarp cover over said open top trailer and in combination an elongated outside element having in cross section a depending first leg for securing to said trailer, a second leg secured at an angle to said first leg,
a third leg secured to said second leg and extending in an opposite direction to said first leg,
a fourth leg secured to said third leg and extending toward said first leg,
said opening in one of said transverse legs having a center line at a distance from the end of one of said transverse legs approximately equal to the distance between the center line of the opening in other transverse leg and the point of contact between said other transverse leg plus the approximate transverse length of said second leg.

* * * * *